United States Patent
Sahin et al.

(10) Patent No.: US 11,689,966 B2
(45) Date of Patent: Jun. 27, 2023

(54) 5G NETWORK HAVING AN EXTERNAL MULTI-PATH TRANSPORT PROTOCOL PROXY NODE

(71) Applicant: Charter Communications Operating, LLC, St. Louis, MO (US)

(72) Inventors: Yildirim Sahin, Englewood, CO (US); Curt Wong, Bellevue, WA (US)

(73) Assignee: Charter Communications Operating, LLC, St. Louis, MO (US)

( * ) Notice: Subject to any disclaimer, the term of this patent is extended or adjusted under 35 U.S.C. 154(b) by 199 days.

(21) Appl. No.: 17/070,539

(22) Filed: Oct. 14, 2020

(65) Prior Publication Data
US 2022/0116822 A1    Apr. 14, 2022

(51) Int. Cl.
*H04L 5/00* (2006.01)
*H04L 67/56* (2022.01)
*H04L 45/24* (2022.01)
*H04W 28/08* (2023.01)
*H04L 61/5007* (2022.01)

(52) U.S. Cl.
CPC ....... *H04W 28/0835* (2020.05); *H04L 5/0044* (2013.01); *H04L 45/24* (2013.01); *H04L 61/5007* (2022.05); *H04L 67/56* (2022.05)

(58) Field of Classification Search
CPC .... H04W 28/08; H04L 61/5007; H04L 67/56; H04L 5/0044; H04L 5/0046; H04L 27/2608; H04L 45/24
See application file for complete search history.

(56) References Cited

U.S. PATENT DOCUMENTS

| | | | | |
|---|---|---|---|---|
| 11,178,725 | B2* | 11/2021 | Talebi Fard | .......... H04W 28/08 |
| 2019/0306068 | A1* | 10/2019 | Kiss | ...................... H04W 36/08 |
| 2021/0007166 | A1* | 1/2021 | Liao | ...................... H04W 48/16 |

(Continued)

OTHER PUBLICATIONS

3GPP, "TS 23.501—System architecture for the 5G System (5GS)." Technical Specification, Release 16, Version 16.6.0 (Sep. 2020): 1-447.

(Continued)

*Primary Examiner* — Kent Krueger
(74) *Attorney, Agent, or Firm* — Mendelsohn Dunleavy, P.C.; Steve Mendelsohn

(57) ABSTRACT

A 5G network having a multi-path transport protocol (MPTP) proxy external to the user plane function (UPF). The session management function (SMF) provides address information of the external MPTP proxy to user equipment (UE) and distributes access traffic steering, switching, and splitting (ATSSS)-related rules to the UE, the UPF, and the external MPTP proxy. The external MPTP proxy receives, from the UPF, (i) 3GPP uplink data transmitted by the UE via a 3GPP radio access network (RAN) and (ii) non-3GPP uplink data transmitted by the UE via a non-3GPP RAN, combines the 3GPP and non-3GPP uplink data to form network uplink data for a data network. The external MPTP proxy also divides received network downlink data into 3GPP downlink data and non-3GPP downlink data, and provides the 3GPP and non-3GPP downlink data to the UPF for transmission to the UE via the 3GPP RAN and the non-3GPP RAN, respectively.

26 Claims, 9 Drawing Sheets

(56) References Cited

U.S. PATENT DOCUMENTS

2022/0167446 A1* 5/2022 Youn .................... H04W 48/18
2022/0225349 A1* 7/2022 Chin .................... H04W 60/04

OTHER PUBLICATIONS

3GPP, "TS 23.502—Procedures for the 5G System (5GS)." Technical Specification, Release 16, Version 16.4.0 (Mar. 2020): 1-582.
3GPP, "TS 23.503—Policy and charging control framework for the 5G System (5GS)." Technical Specification, Release 16, Version 16.6.0 (Sep. 2020): 1-118.
3GPP, "TS 24.193—Access Traffic Steering, Switching and Splitting (ATSSS)." Technical Specification, Release 16, Version 16.1.0 (Sep. 2020): 1-50.
3GPP, "TS 24.501—Non-Access-Stratum (NAS) protocol for 5G System (5GS)." Technical Specification, Release 16, Version 16.6.0 (Sep. 2020): 1-744.
3GPP, "TS 29.244—Interface between the Control Plane and the User Plane Nodes." Technical Specification, Release 16, Version 16.5.0 (Sep. 2020): 1-313.
3GPP, "TS 29.500—Technical Realization of Service Based Architecture;" Technical Specification, Release 16, Version 16.5.0 (Sep. 2020): 1-82.

\* cited by examiner

5G NETWORK HAVING AN EXTERNAL MULTI-PATH TRANSPORT PROTOCOL PROXY NODE

BACKGROUND

Field of the Disclosure

The present disclosure relates to communication networks and, more specifically but not exclusively, to multi-path transport protocol proxy functionality, such as (without limitation) Multi-Path Transmission Control Protocol (MPTCP) proxy functionality, for 5G communication networks.

Description of the Related Art

This section introduces aspects that may help facilitate a better understanding of the disclosure. Accordingly, the statements of this section are to be read in this light and are not to be understood as admissions about what is prior art or what is not prior art.

The $3^{rd}$ Generation Partnership Project (3GPP) Release-16 specifications, the teachings of which are incorporated herein by reference in their entirety, for $5^{th}$ Generation (5G) communication networks, have introduced an Access Traffic Steering, Switching, and Splitting (ATSSS) feature to steer, switch, and split the Multi-Access (MA) Protocol Data Unit (PDU) session traffic across a 3GPP radio access network (RAN) and a non-3GPP RAN. 3GPP specifications (e.g., 3GPP TS 23.501, 3GPP TS 23.502, 3GPP TS 24.501, 3GPP TS 24.193, and 3GPP TS 29.244) have specified ATSSS-related rules for uplink and downlink user traffic, which is in the scope of the PDU session context.

FIG. 1 is a block diagram showing the architecture of a conventional example 5G network 100 that supports multi-path communications between a User Equipment (UE) 110 and a data network 160 (e.g., the Internet) for non-roaming and roaming with local breakout architecture for ATSSS support. In particular, the UE 110 can wirelessly transmit 3GPP uplink data to a 3GPP Radio Access Network (RAN) 120 and non-3GPP uplink data to a non-3GPP RAN 130. In addition, the 3GPP RAN 120 can wirelessly transmit 3GPP downlink data to the UE 110, and the non-3GPP RAN 130 can wirelessly transmit non-3GPP downlink data to the UE 110.

The 3GPP RAN 120 forwards the 3GPP uplink data to the User Plane Function (UPF) 140 via the N3 interface 125, and the non-3GPP RAN 130 forwards the non-3GPP uplink data to the UPF 140 via N3 interface 135. The UPF 140 combines the 3GPP and non-3GPP uplink data to form network uplink data that is forwarded to the data network 160 via the N6 interface 155. Reciprocally, the data network 160 forwards network downlink data to the UPF 140 via the N6 interface 155, the UPF 140 divides the network downlink data into 3GPP and non-3GPP downlink data, forwards the 3GPP downlink data to the 3GPP RAN 120 via the N3 interface 125 for wireless transmission to the UE 110, and forwards the non-3GPP downlink data to the non-3GPP RAN 130 via the N3 interface 135 for wireless transmission to the UE 110.

As shown in FIG. 1, the UE 110 has Multi-Path Transmission Control Protocol (MPTCP) functionality 112 that applies ATSSS-related uplink rules that control how the UE 110 divides its uplink data into 3GPP and non-3GPP uplink data. Similarly, the UPF 140 has MPTCP proxy functionality 150 that applies ATSSS-related downlink rules that control how the UPF 140 divides its downlink data into 3GPP and non-3GPP downlink data.

Prior to the data communications described above, the ATSSS-related uplink and downlink rules are distributed within the 5G network 100 using MA PDU session establishment procedures. In particular, the Session Management Function (SMF) 180 either derives the ATSSS-related rules from ATSSS control information received from the Policy Control Function (PCF) 170 on the N7 interface 175 if dynamic Policy and Charging Control (PCC) is used, or the SMF 180 can have the ATSSS-related rules via local configuration (i.e., local policy configured in the SMF 180). The SMF 180, in turn, provides the ATSSS-related uplink rules to the Access and Mobility Management Function (AMF) 190 via the N11 interface 185, which, in turn, provides the ATSSS-related uplink rules to the UE 110 via Non-Access Stratum (NAS) protocol signaling on the N1 interface 195 and the 3GPP RAN 120 and/or on the N1 interface 197 and the non-3GPP RAN 130. In addition, the SMF 180 provides the ATSSS uplink and downlink rules to the UPF 140 via Packet Forwarding Control Protocol (PFCP) protocol signaling on the N4 interface 145. In 3GPP specifications (e.g., 3GPP TS 23.501), the ATSSS-related rules in the UE are called ATSSS rules; and the ATSSS-related rules in the UPF are called N4 rules.

FIG. 2 is a representation of the MA PDU session establishment procedure for the establishment of a UE-requested PDU session for non-roaming and roaming with local breakout architecture according to FIG. 4.3.2.2.1-1 of the 3GPP Technical Specification (TS) 23.502 v16.4.0, the teachings of which are incorporated herein by reference in their entirety. For purposes of the present disclosure, Steps 9 and 10 are most relevant. The 3GPP TS 23.502 provides detailed descriptions of all of the steps in clauses 4.3.2.2.1 and 4.22.2.1. The descriptions of Steps 9 and 10 are repeated below.

Note that, for MA PDU session establishment for roaming with home-routed architecture as per FIG. 4.2.10-2 in 3GPP TS 23.501, the corresponding procedure is described in clauses 4.3.2.2.2 and 4.22.2.2 of 3GPP TS 23.502, where Steps 11 and 12 of clause 4.3.2.2.2 are equivalent to Steps 9 and 10 of clause 4.3.2.2.1.

According to Step 9, the SMF may perform an SMF-initiated Session Management (SM) Policy Association Modification procedure (as defined in clause 4.16.5.1 of 3GPP TS 23.502) to provide information on the Policy Control Request Trigger condition(s) that have been met. If the Request Type is "initial request," the dynamic Policy and Charging Control (PCC) is deployed, and the PDU Session Type is IPv4, IPv6, or IPv4v6, then the SMF notifies the PCF (if the Policy Control Request Trigger condition is met) with the allocated IP address/prefix(es) for the UE.

When the PCF is deployed, the SMF shall further report the Packet Services (PS) Data Off status to the PCF if the PS Data Off Policy Control Request Trigger is provisioned. (The additional behavior of the SMF and the PCF for 3GPP PS Data Off is defined in 3GPP TS 23.503.)

If an IP address/prefix has been allocated before Step 7 (e.g., subscribed static IP address/prefix in Unified Data Management (UDM)/Unified Data Repository (UDR) or if Step 7 is performed after Step 8, then the IP address/prefix can be provided to the PCF in Step 7, and the IP address/prefix notification in Step 9 can be skipped.

The PCF may provide information about updated policies to the SMF as defined in clause 5.2.5.4 in 3GPP TS 23.502 (and in 3GPP TS 23.503) to the SMF.

According to Step 10, if the Request Type indicates "initial request," then the SMF initiates an N4 Session Establishment procedure with the selected UPF(s); otherwise, the SMF initiates an N4 Session Modification procedure with the selected UPF(s).

According to Step 10a, the SMF sends an N4 Session Establishment/Modification Request to the UPF and provides Packet detection, enforcement, and reporting rules to be installed on the UPF for this PDU Session. If the SMF is configured to request IP address allocation from the UPF, as described in 3GPP TS 23.501 clause 5.8.2, then the SMF indicates to the UPF to perform the IP address/prefix allocation, and includes the information required for the UPF to perform the allocation. If the selective User Plane deactivation is required for this PDU Session, then the SMF determines the Inactivity Timer and provides the Inactivity Timer to the UPF. The SMF provides Trace Requirements to the UPF if the SMF has received Trace Requirements. If the Reliable Data Service is enabled for the PDU Session by the SMF, as specified in 3GPP TS 23.501, then the RDS Configuration information is provided to the UPF in this step. The SMF provides Small Data Rate Control parameters to the UPF for the PDU Session, if required. The SMF provides the Small Data Rate Control Status to the UPF, if received from the AMF. If the Serving Public Land Mobile Network (PLMN) intends to enforce Serving PLMN Rate Control (see clause 5.31.14.2 of 3GPP TS 23.501) for this PDU session, then the SMF provides Serving PLMN Rate Control parameters to the UPF for limiting the rate of downlink control plane data packets.

For a PDU Session of type Ethernet, the SMF (e.g., for a certain requested Data Network Name (DNN)/Single-Network Slice Selection Assistance Information (S-NSSAI) may include an indication to request the UPF to provide port numbers.

If the SMF decides to perform redundant transmission for one or more Quality of Service (QoS) Flows of the PDU session, as described in clause 5.33.1.2 of 3GPP TS 23.501, then two sets of Core Network (CN) Tunnel Information are requested by the SMF from the UPF. The SMF also indicates to the UPF to eliminate the duplicated packet for the QoS Flow in the uplink direction. The SMF indicates to the UPF that one set of CN Tunnel Information is used as the redundancy tunnel of the PDU session, as described in clause 5.33.2.2 of 3GPP TS 23.501.

If the SMF decides to insert two Intermediate UPFs (I-UPFs) between the PDU Session Anchor (PSA) UPF and the non-3GPP RAN for redundant transmission, as described in clause 5.33.1.2 of 3GPP TS 23.501, then the SMF requests the corresponding sets of CN Tunnel Information and provides that information to the I-UPFs and the PSA UPF, respectively. The SMF also indicates to the PSA UPF to eliminate the duplicated packet for the QoS Flow in the uplink direction. The SMF indicates to the PSA UPF that one set of CN Tunnel Information is used as the redundancy tunnel of the PDU session, as described in clause 5.33.2.2 of 3GPP TS 23.501.

The method to perform elimination and reordering on RAN/UPF based on the packets received from the two Generic Packet Radio Service (GPRS) Tunneling Protocol User Plane (GTP-U) tunnels is up to RAN/UPF implementation. The two GTP-U tunnels are terminated at the same RAN node and UPF.

If Control Plane Cellular Internet of Things (CIoT) 5GS Optimization is enabled for this PDU session and the SMF selects the Network Exposure Function (NEF) as the anchor of this PDU Session in Step 8, then the SMF performs the SMF-NEF Connection Establishment Procedure, as described in clause 4.24.1 of 3GPP TS 23.502.

According to Step 10b, the UPF acknowledges by sending an N4 Session Establishment/Modification Response. If the SMF indicates in Step 10a that IP address/prefix allocation is to be performed by the UPF, then this response contains the requested IP address/prefix. The requested set of CN Tunnel Information is provided to the SMF in this step. If the SMF indicated to the UPF to perform packet duplication and elimination for the QoS Flow in Step 10a, then two sets of CN Tunnel Information are allocated by the UPF and provided to the SMF. If the SMF decides to insert two I-UPFs between the PSA UPF and the non-3GPP RAN for redundant transmission, as described in clause 5.33.1.2 of 3GPP TS 23.501, then the sets of CN Tunnel Information of two I-UPFs and the UPF (PSA) are allocated by the UPFs and provided to the SMF. The UPF indicates to the SMF that one set of CN Tunnel Information is used as the redundancy tunnel of the PDU session, as described in clause 5.33.2.2 of 3GPP TS 23.501.

If the SMF requested the UPF to provide port numbers, then the UPF includes port numbers for the Network-Side Time-Sensitive Networking (TSN) Translator (NW-TT) port and the Device-Side TSN Translator (DS-TT) port in the response.

If multiple UPFs are selected for the PDU Session, then the SMF initiates the N4 Session Establishment/Modification procedure with each UPF of the PDU Session in this step.

If the PCF has subscribed to the UE Internet Protocol (IP) address change Policy Control Trigger, as specified in clause 6.1.3.5 of 3GPP TS 23.503, then the SMF notifies the PCF about the IP address/prefix allocated by the UPF. This is not shown in FIG. 2.

As per clause 4.22.2.1 in 3GPP TS 23.502, the MA PDU session-related aspects for Steps 10, 10a and 10b are as follows: In Step 10, the N4 rules derived by the SMF for the MA PDU session are sent to the UPF, and the two sets of N3 uplink (UL) CN tunnel information are allocated by the UPF. If the ATSSS Capability for the MA PDU Session indicates "ATSSS-LL Capability," then the SMF may include information for measurement into the N4 rule to instruct the UPF to initiate performance measurement for this MA PDU Session. In Step 10a, the UPF allocates addressing information for the Performance Measurement Function (PMF) in the UPF. In Step 10b, the UPF sends the addressing information for the PMF in the UPF to the SMF. In Steps 8-21 of FIG. 2, the SMF establishes the user-plane resources over the 3GPP access, i.e., over the access where the PDU Session Establishment Request was sent on.

SUMMARY

In accordance with the principles of the present disclosure, the MPTCP proxy is implemented external to the UPF in a 5G network. External implementation of the MPTCP proxy may, for example, allow the operator deployment flexibility and extend the usage of 3GPP ATSSS architecture and framework by adding another MPTCP link for another IP connectivity (e.g., using another 3GPP access or non-3GPP access) with updated ATSSS-related rules.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Figure 1:
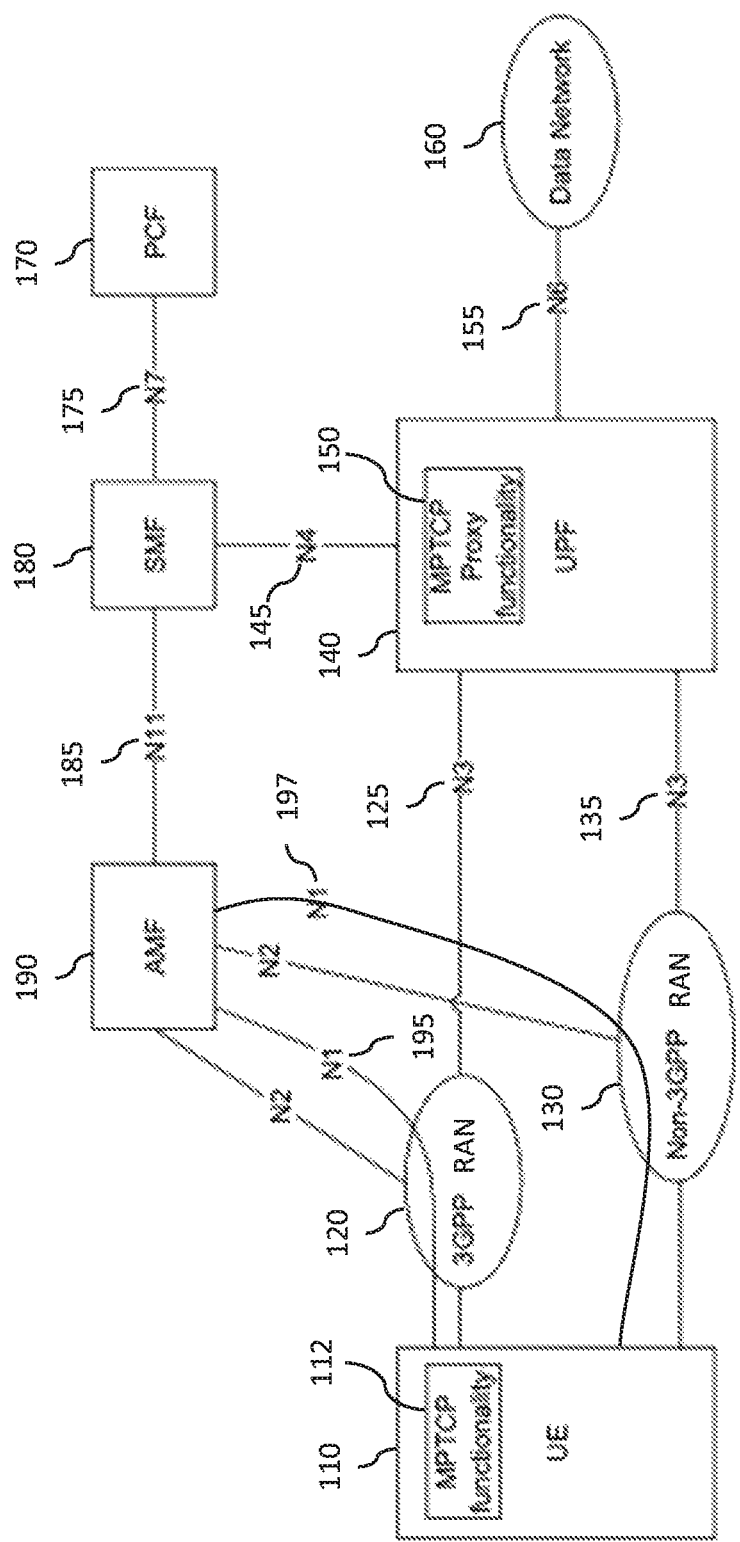
FIG. 1 is a block diagram showing the architecture of a conventional example 5G network that supports multi-path communications between a UE and a data network (e.g., the Internet)

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/ acts involved.

External MPTCP Proxy Selection and Distribution of ATSSS-Related Rules

As per Rel-16 3GPP TS 23.501 and 3GPP TS 29.244, during the MA PDU Session Establishment procedure, the MPTCP Proxy Address Information of the internal (i.e., in UPF) MPTCP proxy is provided from the UPF to the SMF (because the MPTCP Proxy functionality resides in the UPF) and then the information is transferred to the UE during the rest of the procedure. For an external MPTCP proxy implementation, this disclosure proposes two different techniques regarding what 5GC node (SMF or UPF) selects the external MPTCP proxy node to be used for an MA PDU session and how the MPTCP Proxy address information (e.g., Proxy type, Proxy TCP port number, Proxy IP address(es)) are to be retrieved by the SMF. In the first technique, the SMF selects an external MPTCP proxy node and retrieves its address information. In the second technique, the UPF selects an external MPTCP proxy node and retrieves its address information, and then the UPF provides the information to the SMF as part of N4 PFCP signaling as described in 3GPP TS 29.244.

Selection of an external MPTCP proxy node and retrieval of its address information by an SMF or a UPF could be performed via pre-configuration in these nodes. Alternatively, external MPTCP proxy node selection could be performed using some other methods such as introduction of Domain Name Service/Dynamic Host Configuration Protocol (DNS/DHCP)-based solutions or a Network Repository Function (NRF)-based solution similar to UPF node selection in Clause 6.3.3 in 3GPP TS 23.502.

There are also different solution techniques for passing the ATSSS-related rules to the external MPTCP proxy for an MA PDU session. According to a first technique, the SMF provisions the applicable ATSSS-related rules directly to the external MPTCP proxy. According to a second technique, after the UPF receives the ATSSS-related rules from the SMF, as per 3GPP TS 29.244, the UPF provisions the applicable ATSSS-related rules to the external MPTCP proxy.

The delivery method/protocol of these ATSSS-related rules to the external MPTCP proxy could be implemented (i) as a proprietary interface, (ii) as an extension to an existing 3GPP protocol/Service-Based Interface (SBI), or (iii) by definition of a new SBI interface. For example, when the SMF provides the ATSSS-related rules directly to the external MPTCP proxy, the PFCP protocol (3GPP TS 29.244) may be extended between the SMF and the external MPTCP proxy.

The content of the ATSSS-related rules provided to the external MPTCP proxy may include applicable parts of downlink (DL) Packet Detection Rules (PDRs) and associated Multi-Access Rules (MARs): UE IP address(es), link-specific multipath IP address(es) per-access type, and associated per-access level downlink steering mode and forwarding action information for each MPTCP-type traffic established between the UE and application server(s) in the data network. The ATSSS-related rules may also contain the PDU session identifier and/or the UE identifier and MPTCP control information, which indicates that the external MPTCP proxy is expected to function as a Transport Converter, as specified in 3GPP TS 29.244.

The PDR and MAR are specified in 3GPP TS 29.244. The applicable part of a PDR to be provided to the external MPTCP proxy is the MPTCP packet detection information. The external MPTCP proxy may compare the source IP address and the destination IP address of the incoming downlink packet with the server IP address and the UE IP address, and also check if there is an MPTCP connection already established for the UE IP address, then apply the relevant parts of the associated MAR to the packet to perform required IP address translations (i.e., subflows) towards the UE. The content of a MAR is depicted in Table 5.8.2.11.8-1 of 3GPP TS 23.501, where the Steering Mode, Forwarding Action Rule ID, Weight, and Priority are relevant MAR steering information per access type (i.e., 3GPP and non-3GPP) that is needed by the external MPTCP proxy.

Figure 3:
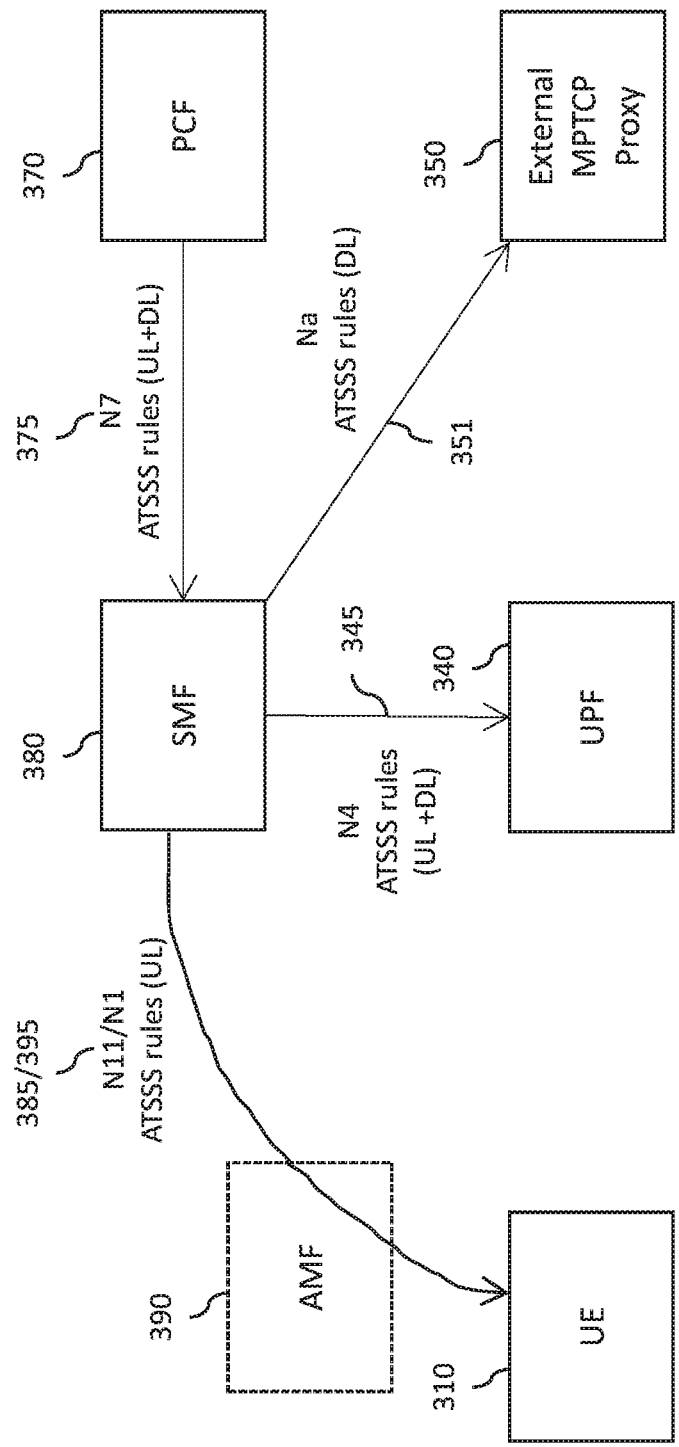
FIG. 3 is a block diagram showing the architecture of an example 5G network, according to one embodiment of the disclosure.

FIG. 3 is a block diagram showing the architecture of an example 5G network 300 that supports multi-path communications between a UE 310 and a data network (not shown in FIG. 3), according to one embodiment of the disclosure. The 5G network 300 is similar to the conventional 5G network 100 of FIG. 1 with analogous elements having analogous labels, except that, in the 5G network 300, the MPTCP proxy 350 is implemented external to the UPF 340. Note that the UE 110 and UPF 140 of FIG. 1 also have ATSSS Low-Layer (ATSSS-LL) and Performance Measurement Function (PMF) functionalities that are not shown in FIG. 1 because the present disclosure is related to MPTCP functionality and not to ATSSS-LL functionality or PMF functionality.

Figure 2:
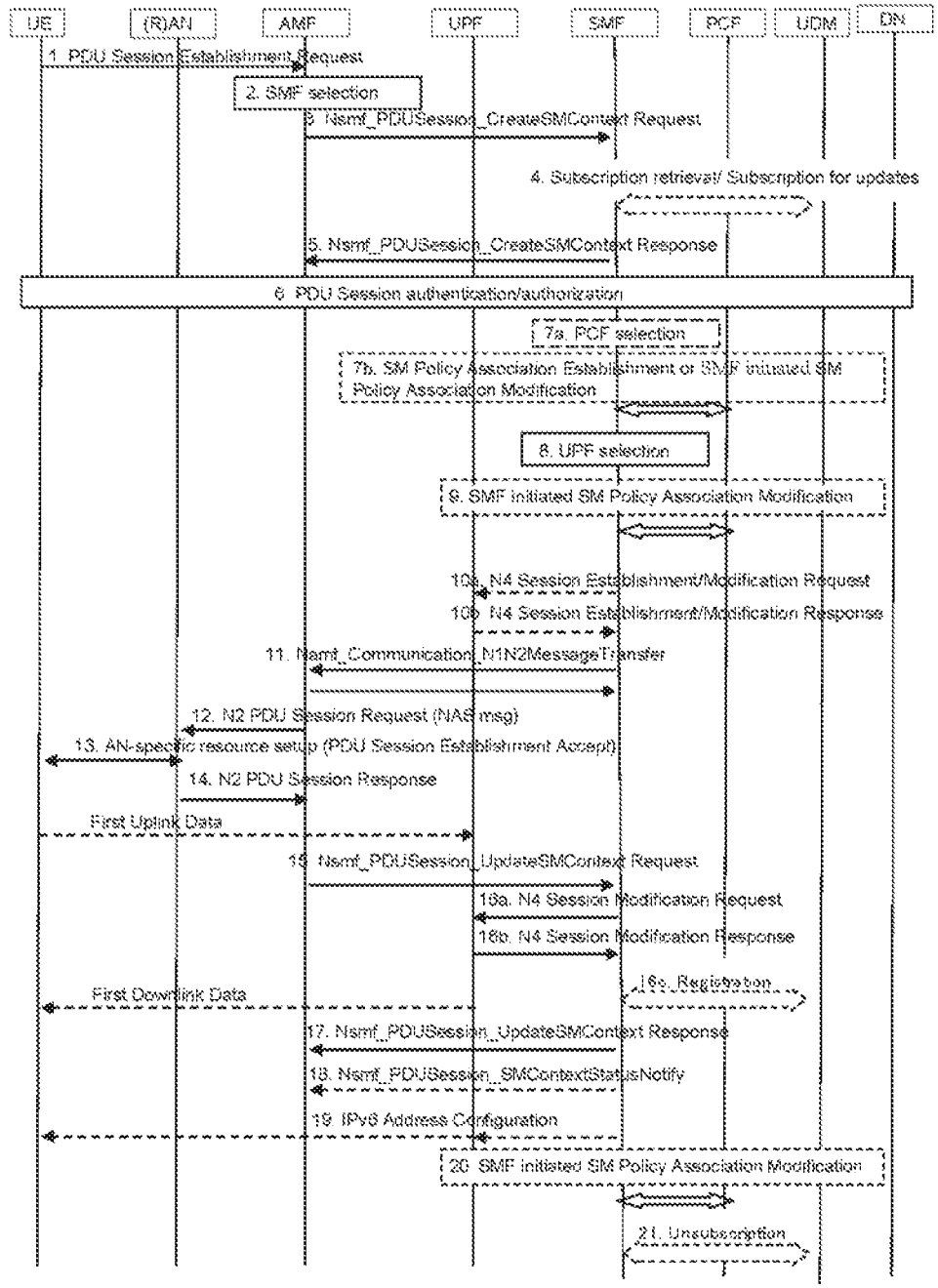
FIG. 2 is a representation of the MA PDU session establishment procedure for the establishment of a UE-requested PDU session for non-roaming and roaming with local breakout architecture.
Figure 4:
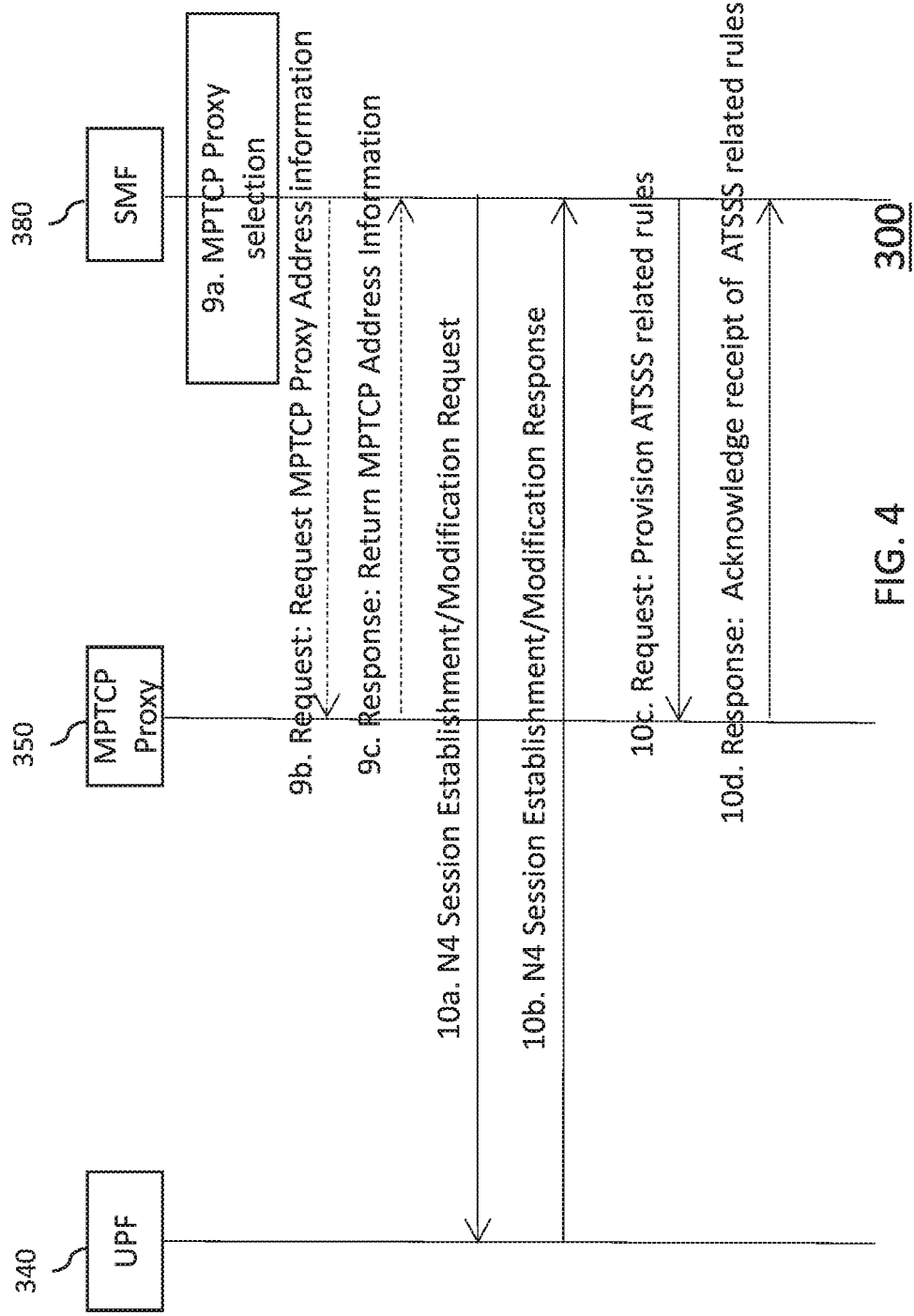
FIG. 4 is a representation of Steps 9 and 10 of the MA PDU session establishment procedure according to one possible implementation of the procedure for the 5G network of FIG. 3.

FIG. 4 is a representation of Steps 9 and 10 of the MA PDU session establishment procedure according to one possible implementation of the procedure for the 5G network 300 of FIG. 3. The processing of Steps 1-8 and 11-21 are similar to those steps in FIG. 2. As represented in FIGS. 3 and 4, in the 5G network 300, the SMF 380 (i) directly queries the external MPTCP proxy 350 for IP address(es) and port information via the Na interface 351 and (ii) distributes ATSSS downlink rules directly to the external MPTCP proxy 350 via the Na interface 351. The processing of Steps 9 and 10 is the same as the processing of Steps 9 and 10 of FIG. 2 with the following exceptions.

In Step 9a, if the SMF 380 is pre-configured that an external MPTCP proxy will be used, then the SMF 380 selects an external MPTCP proxy (in this example, the external MPTCP proxy 350) to be used for the PDU session.

In Step 9b, if the IP address(es) and TCP port number of the external MPTCP proxy 350 are not pre-configured in the SMF 380, then the SMF 380 will send a message via the Na interface 351 to the external MPTCP proxy 350 requesting such information. The SMF 380 may contain MPTCP Control Information (similar to the one specified in clause 8.2.154 of 3GPP TS 29.244), which indicates that the external MPTCP proxy 350 is expected to function as a Transport Converter.

In Step 9c, the external MPTCP proxy 350 responds to the SMF 380 via the Na interface 351 with the IP address(es) and the port information of the external MPTCP proxy 350.

In Step 10a, for the case of MA PDU Session establishment, the SMF 380 includes the MPTCP Address Information Information Element (IE) (see clause 8.2.157 of 3GPP TS 29.244) in a Session Establishment/Modification Request to the UPF 340 via the N4 interface 345 that is also an indication to the UPF 340 that the external MPTCP proxy 350 is used. In Step 10b, because either the external MPTCP proxy 350 sends its address information directly to the SMF 380 via the Na interface 351 or external MPTCP address information is pre-configured in the SMF 380, the UPF 340 does not need to allocate internal MPTCP proxy resources, and the UPF 340 does not need to return MPTCP address information. However, the UPF 340 will still allocate the UE Link-Specific IP address(es) and TCP port number for 3GPP access and/or non-3GPP access. Otherwise, Steps 10a and 10b are similar to Steps 10a and 10b of FIG. 2.

In Step 10b, the MPTCP Address Information IE is a mandatory IE in MPTCP Parameters IE (as specified in Table 7.5.3.7-2 of 3GPP TS 29.244) within a PFCP Session Establishment Response message or PFCP Session Modification Response message. For protocol backward compatibility, the MPTCP IP Address IE may be populated with the external MPTCP information received from the SMF 380.

In Step 10c, the SMF 380 derives the ATSSS-related downlink rules for the external MPTCP proxy 350 and sends those ATSSS-related downlink rules to the external MPTCP proxy 350 via the Na interface 351. The information sent to the external MPTCP proxy 350 may include applicable parts of Downlink (DL) Packet Detection Rules (PDRs) and associated Multi-Access Rules (MARs): PDU session identifier and/or UE identifier, UE IP address(es), link-specific multipath IP address(es) per-access type, and associated per-access level downlink steering mode and forwarding action information for each MPTCP-type traffic established between the UE 310 and application server(s) of the data network.

In Step 10d, the external MPTCP proxy 350 responds to the SMF 380 via the Na interface 351 acknowledging the receipt of the ATSSS-related downlink rules.

Figure 5:
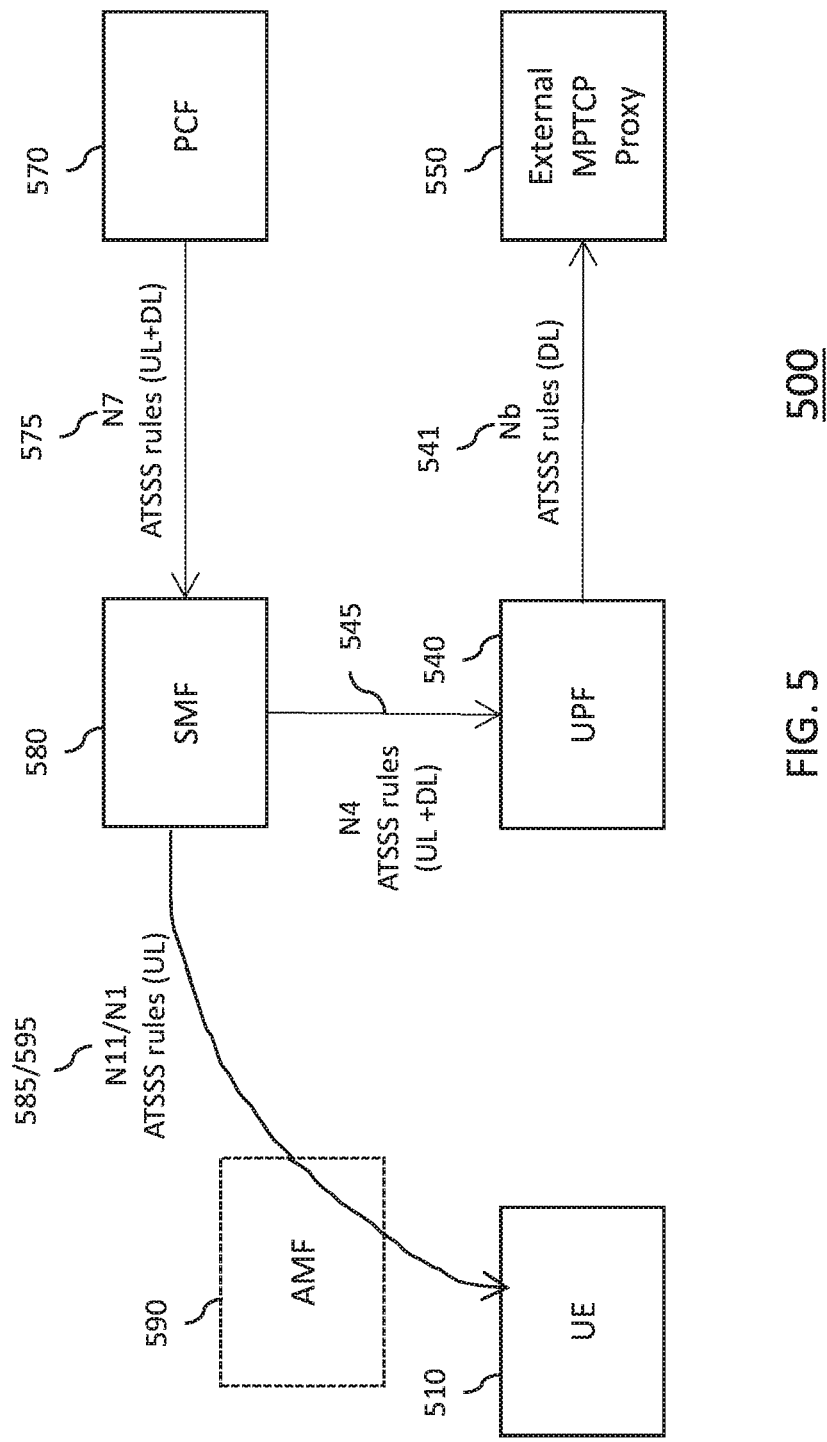
FIG. 5 is a block diagram showing the architecture of an example 5G network, according to another embodiment of the disclosure.

FIG. 5 is a block diagram showing the architecture of an example 5G network 500 that supports multi-path communications between a UE 510 and a data network (not shown in FIG. 5), according to another embodiment of the disclosure. The 5G network 500 is similar to the conventional 5G network 100 of FIG. 1 with analogous elements having analogous labels, except that, in the 5G network 500, the MPTCP proxy 550 is implemented external to the UPF 540.

Figure 6:
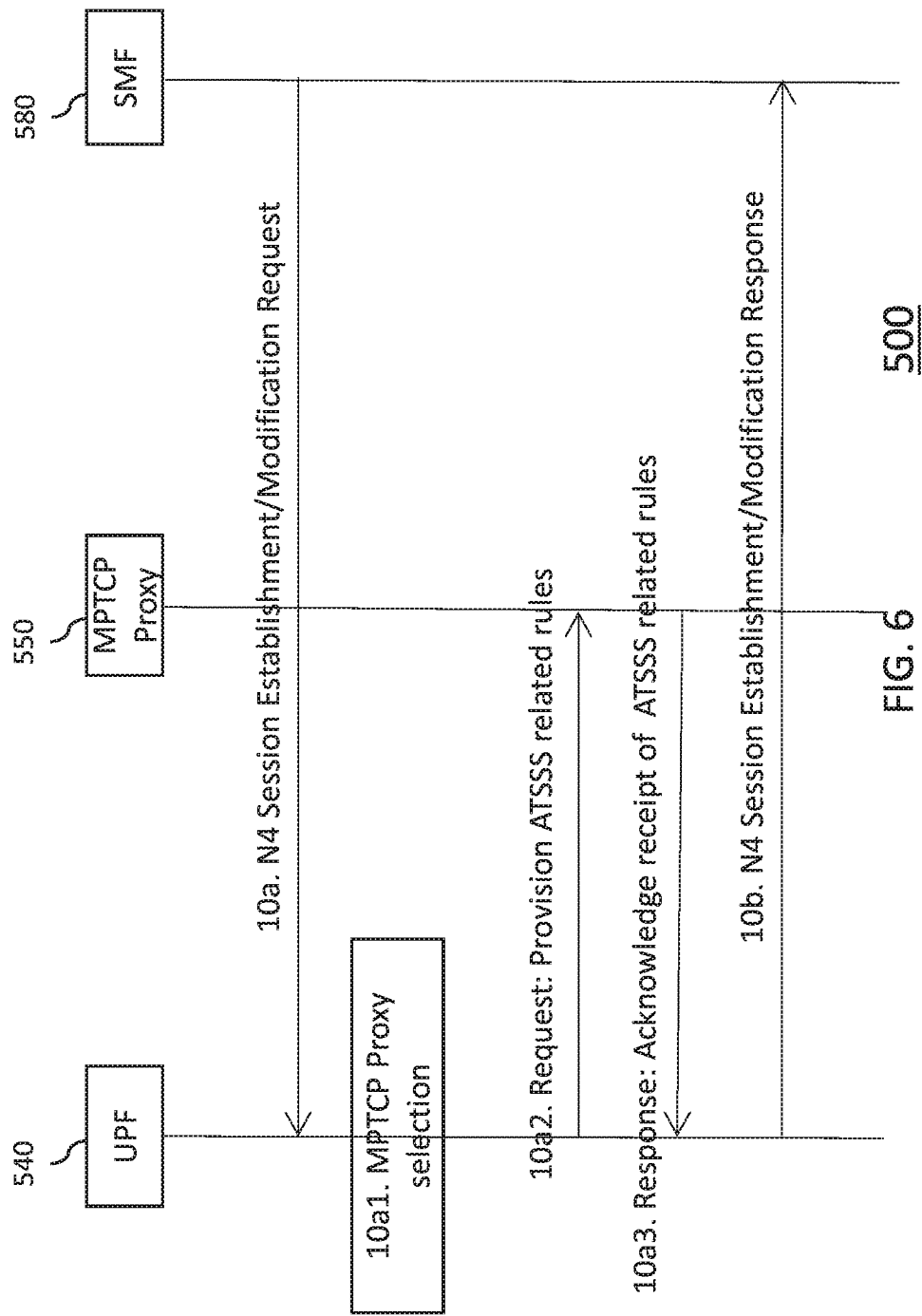
FIG. 6 is a representation of Step 10 of the MA PDU session establishment procedure according to one possible implementation of the procedure for the 5G network of FIG. 5.

FIG. 6 is a representation of Step 10 of the MA PDU session establishment procedure according to one possible implementation of the procedure for the 5G network 500 of FIG. 5. The processing of Steps 1-9 and 11-21 are similar to those steps in FIG. 2. As represented in FIGS. 5 and 6, in the 5G network 500, if needed, the UPF 540 (i) directly queries the external MPTCP proxy 550 for IP address(es) and port information via the Nb interface 541 and (ii) distributes ATSSS-related downlink rules directly to the external MPTCP proxy 550 via the Nb interface 541. The processing of Step 10 is the same as the processing of Step 10 of FIG. 2 with the following exceptions.

In Step 10a1, if the UPF 540 is pre-configured that an external MPTCP proxy will be used, then the UPF 540 selects an external MPTCP proxy (in this case, the external MPTCP proxy 550) to be used for the PDU session.

In Step 10a2, based on the ATSSS-related rules received from the SMF 580 over the N4 interface 545, the UPF derives the ATSSS-related downlink rules for the external MPTCP proxy 550 and sends those ATSSS-related downlink rules to the external MPTCP proxy 550 via the Nb interface 541. The information sent to the external MPTCP proxy 550 may include applicable parts of DL PDRs and associated MARs: PDU session identifier and/or UE identifier, UE IP address(es), link-specific multipath IP address(es) per-access type, and associated per-access level downlink steering mode and forwarding action information for each MPTCP-type traffic established between the UE 510 and application server(s) of the data network. The information may also contain MPTCP control information (similar to the one specified in clause 8.2.154 of 3GPP TS 29.244), which indicates that the external MPTCP proxy 550 is expected to function as a Transport Converter.

In Step 10a2, if the IP address(es) and port number of the external MPTCP proxy 550 are not pre-configured in the UPF 540, then the UPF 540 also includes an indication in the message requesting the external MPTCP proxy to return such information.

In Step 10a3, the external MPTCP proxy 550 responds to the UPF 540 via the Nb interface 541, including the proxy IP address(es) and proxy port number if requested by the UPF 540.

Uplink Data Routing

Figure 7:
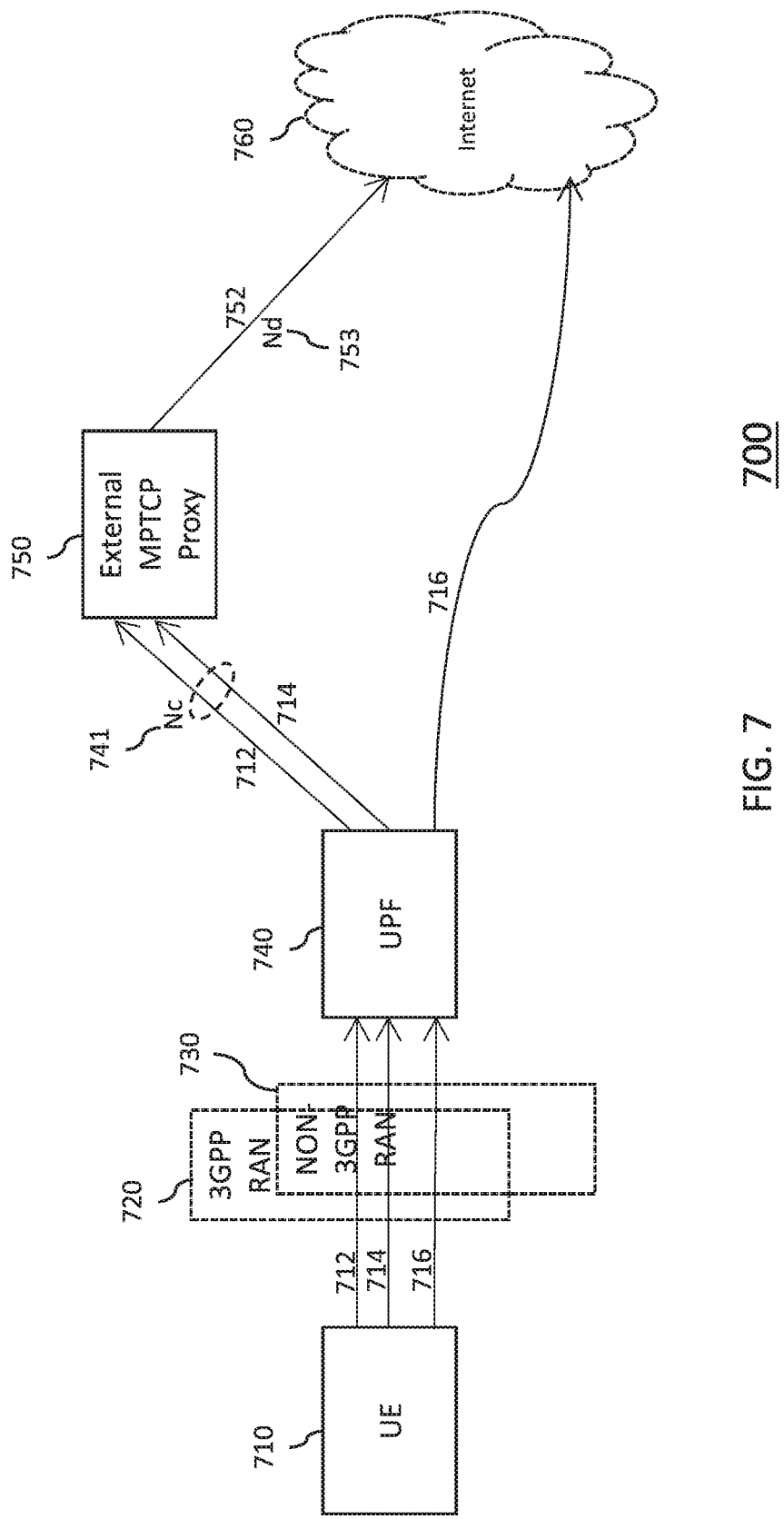
FIG. 7 is a block diagram showing the flow of uplink user data traffic in an example 5G network, according to one embodiment of the disclosure.

FIG. 7 is a block diagram showing the flow of uplink user data traffic from a UE 710 to a data network 760 in an example 5G network 700, according to one embodiment of the disclosure. Note that, depending on the implementation, the 5G network 700 could be the same network as the 5G network 300 of FIG. 3, the 5G network 500 of FIG. 5, or some other suitable 5G network.

For MPTCP traffic, based on the ATSSS-related uplink rules previously received from the SMF (not shown in FIG. 7), the UE 710 divides the uplink data into 3GPP uplink data 712 for wireless transmission via the 3GPP RAN 720 to the UPF 740 and non-3GPP uplink data 714 for wireless transmission via the non-3GPP RAN 730 to the UPF 740. Note that, depending on the ATSSS-related uplink rules and the current situation (e.g. the amount and type of uplink data to be transmitted and current channel characteristics of the 3GPP and non-3GPP RANs 720 and 730), the UE 710 may transmit (i) all of the uplink data as 3GPP uplink data 712 via the 3GPP RAN 720, (ii) all of the uplink data as non-3GPP uplink data 714 via the non-3GPP RAN 730, or (iii) some of both. Note further that, depending on the implementation and/or the current situation, the 3GPP uplink data 712 and the non-3GPP uplink data 714 may be completely different or may be partially or entirely redundant.

The UPF 740 detects the MPTCP traffic by using the existing ATSSS-related rules specified in 3GPP TS 29.244 and then routes the MPTCP subflows to the external MPTCP proxy 750 for IP address translation and then routing to the data network 760. As per 3GPP TS 29.244, the UPF 740 may detect the uplink MPTCP IP packets, e.g., by means of comparing the destination IP address with the stored MPTCP IP address for the PDU session. In particular, the UPF 740 forwards the 3GPP uplink data 712 and the non-3GPP uplink data 714 to the external MPTCP proxy 750 via the Nc user-plane interface 741. The external MPTCP proxy 750 combines the 3GPP uplink data 712 and the non-3GPP uplink data 714 to form network data 752 that is forwarded to the data network 760 via the Nd user-plane interface 753.

Note that, in a 5G network, control-plane traffic and user-plane traffic between any two nodes are separated. As such, the Nb interface 541 between the UPF 540 and the external MPTCP proxy 550 in FIG. 5 is a control-plane interface, while the Nc interface 741 between the UPF 740 and the external MPTCP proxy 750 in FIG. 7 is a user-plane interface.

Note that, in addition to MPTCP traffic, the UE 710 may have non-MPTCP uplink data 716 (e.g., ATSSS-LL traffic) to transmit to the data network 760. This non-MPTCP uplink data 716 is wirelessly transmitted from the UE 710 via the 3GPP RAN 720 and/or the non-3GPP RAN 730 to the UPF 740. The UPF 740 forwards the non-MPTCP uplink data 716 directly to the data network 760 bypassing the external MPTCP proxy 750. In another possible embodiment, the UPF 740 forwards the non-MPTCP uplink data 716 to the data network 760 via the external MPTCP proxy 750, which merely passes the non-MPTCP uplink data 716 without performing any reformatting as per a normal IP routing function that a conventional IP router node performs.

Downlink Data Routing

There are two viable techniques for routing the downlink (DL) user data traffic when an external MPTCP proxy is deployed in the architecture. According to one technique, all DL user data traffic coming from an application server of the data network is first routed to the UPF, then the UPF forwards MPTCP-related traffic to the external MPTCP proxy for creation of MPTCP subflows based on applicable ATSSS-related rules, and then the external MPTCP proxy creates and routes the subflows back to the UPF to be forwarded to the UE. According to the second technique, all DL user traffic coming from the data network is first routed to the external MPTCP proxy, which identifies the MPTCP-related traffic, creates MPTCP subflows based on applicable ATSSS-related rules, and forwards the MPTCP subflows to the UPF to be forwarded to the UE. The non-MPTCP traffic can be handled using a normal IP routing function that a conventional IP router node performs.

Figure 8:
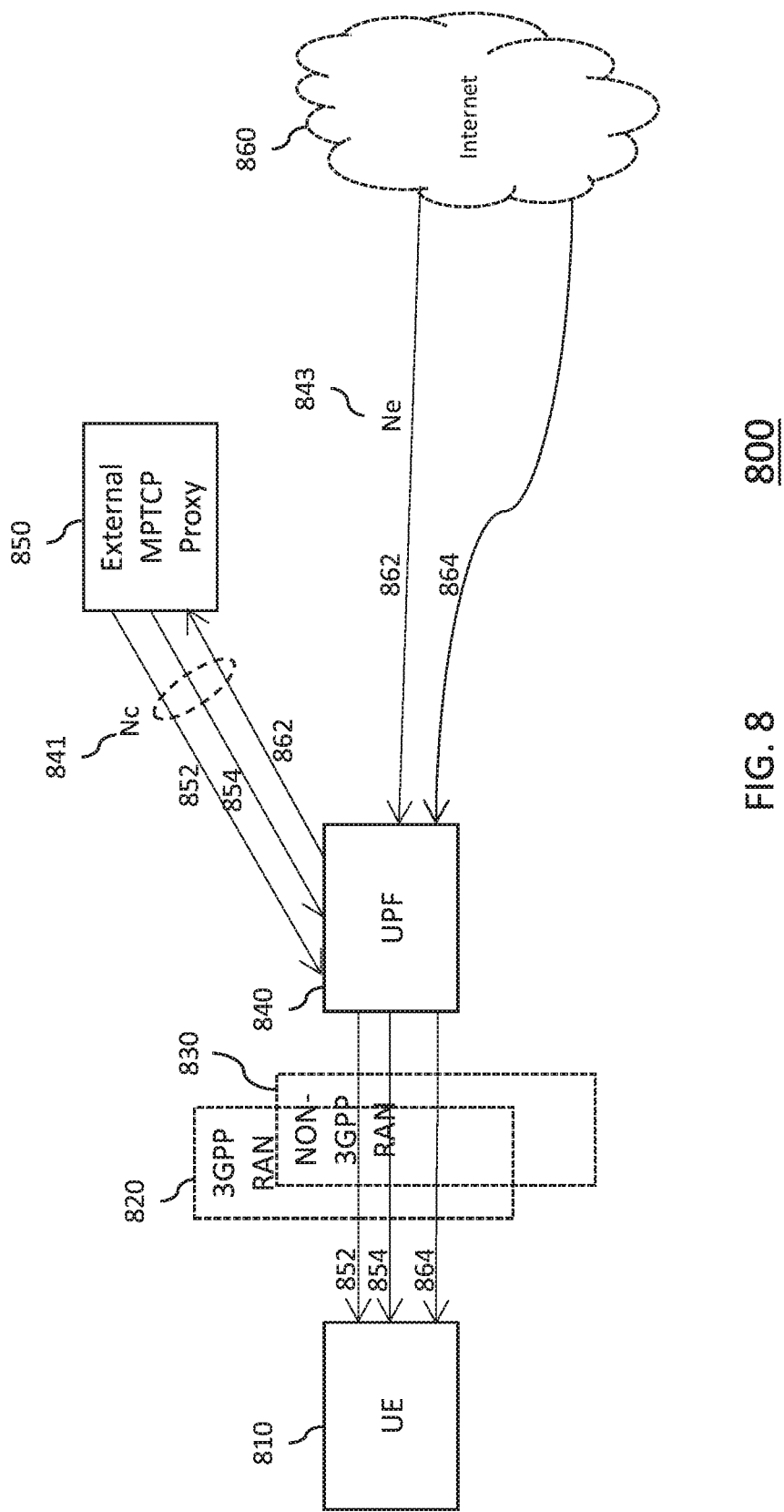
FIG. 8 is a block diagram showing the flow of downlink user data traffic in an example 5G network, according to one embodiment of the disclosure.

FIG. 8 is a block diagram showing the flow of downlink data from a data network 860 to a UE 810 in an example 5G network 800, according to one embodiment of the disclosure. Note that, depending on the implementation, the 5G network 800 could be the same network as the 5G network 700 of FIG. 7 or some other suitable 5G network.

For MPTCP traffic, the data network 860 provides network downlink data 862 to the UPF 840 via the Ne user-plane interface 843, and the UPF 840 passes the network downlink data 862 to the external MPTCP proxy 850 via the Nc user-plane interface 841 without performing any reformatting. The UPF 840 applies PDRs twice for all DL MPTCP traffic. In order to detect the MPTCP traffic, the UPF 840 needs to be provisioned with PDRs that match the source and destination IP addresses of the DL packet to appropriate IP addresses. For the first PDR, the UPF 840 may detect MPTCP traffic to be forwarded to the external MPTCP proxy 850 by comparing the source and destination IP addresses with the server IP address and UE IP address. For the second PDR, the UPF may detect the MPTCP traffic to be forwarded towards the UE by comparing the source or destination IP addresses with the server MPTCP IP Address and link-specific multipath IP address(es). When deciding on forwarding the packets on the appropriate subflows, the external MPTCP proxy 850, in addition to MARs, may also take the performance of the subflows into consideration.

In particular, based on the ATSSS-related downlink rules previously received from the SMF (not shown in FIG. 8), the external MPTCP proxy 850 divides the network downlink data 862 into 3GPP downlink data 852 and non-3GPP downlink data 854. Note that, depending on the ATSSS-related downlink rules and the current situation (e.g. the amount and type of downlink data to be transmitted and current channel characteristics of the 3GPP and non-3GPP RANs 820 and 830), the external MPTCP proxy 850 may convert (i) all of the network downlink data 862 into 3GPP downlink data 852, (ii) all of the network downlink data 862 into non-3GPP uplink data 854, or (iii) some of both. Note further that, depending on the implementation and/or the current situation, the 3GPP downlink data 852 and the non-3GPP downlink data 854 may be completely different or may be partially or entirely redundant.

The external MPTCP proxy 850 forwards (i) the 3GPP downlink data 852 to the UPF 840 for wireless transmission to the UE 810 via the 3GPP RAN 820 and (ii) the non-3GPP downlink data 854 to the UPF 840 for wireless transmission to the UE 810 via the non-3GPP RAN 830. The UE 810 combines the 3GPP and non-3GPP downlink data 852 and 854 recover the network downlink data 862.

Note that, in addition to MPTCP traffic, the data network 860 may have non-MPTCP downlink data 864 to transmit to the UE 810 via the UPF 840. This non-MPTCP downlink data 864 is wirelessly transmitted from the UPF 840 to the UE 810 via the 3GPP RAN 820 and/or the non-3GPP RAN 830. In another possible embodiment, the data network 860 forwards the non-MPTCP downlink data 864 to the UPF 840 via the external MPTCP proxy 850, which merely passes the non-MPTCP downlink data 864 without any reformatting.

Figure 9:
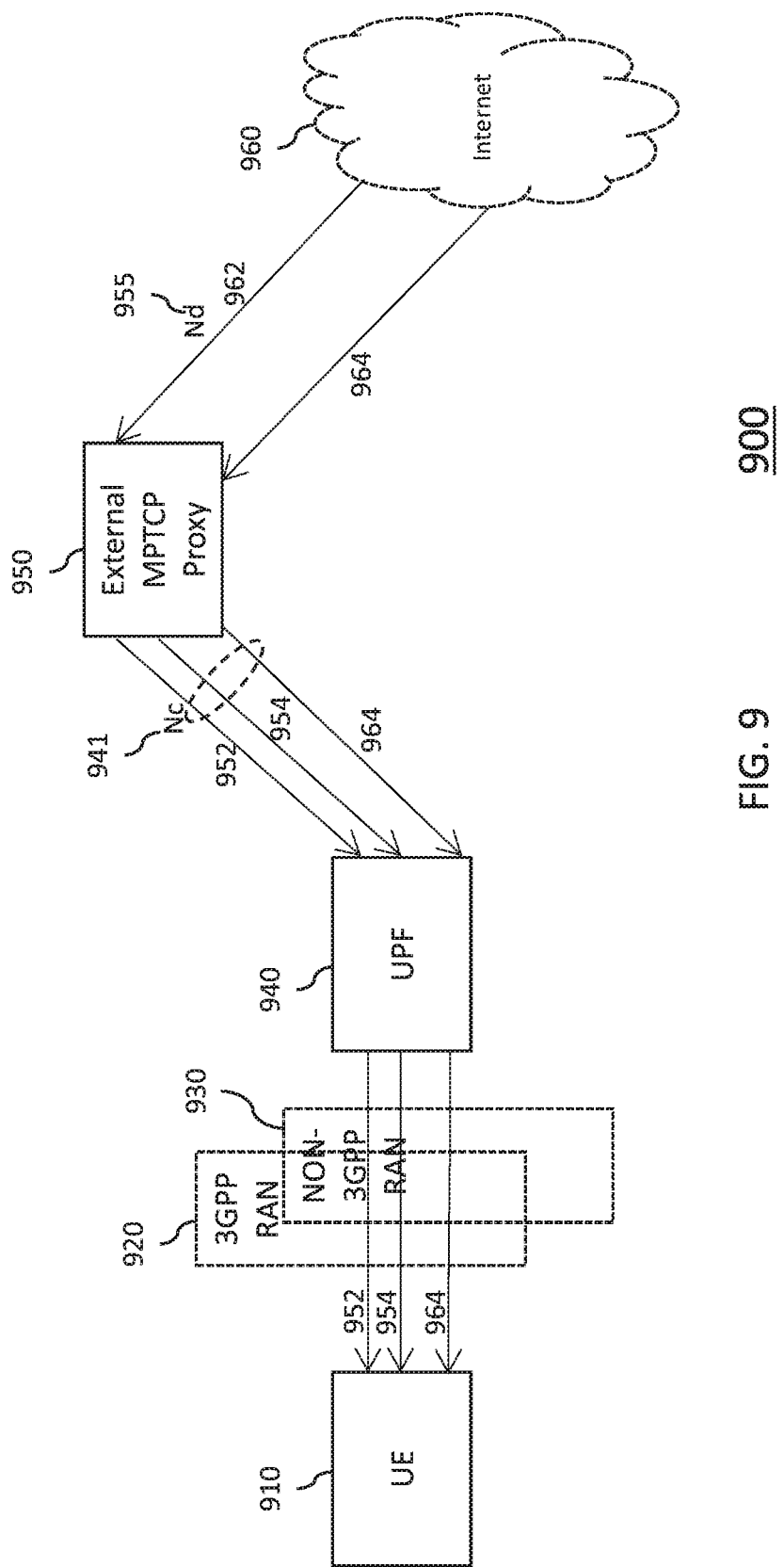
FIG. 9 is a block diagram showing the flow of downlink user data traffic in an example 5G network, according to another embodiment of the disclosure.

FIG. 9 is a block diagram showing the flow of downlink user data traffic from a data network 960 to a UE 910 in an example 5G network 900, according to another embodiment of the disclosure. Note that, depending on the implementation, the 5G network 900 could be the same network as the 5G network 700 of FIG. 7 or some other suitable 5G network.

For MPTCP traffic, the data network 960 provides network downlink data 962 directly to the external MPTCP proxy 950 via the Nd user-plane interface 955. Based on the ATSSS-related downlink rules previously received from the SMF (not shown in FIG. 9), the external MPTCP proxy 950 divides the network downlink data 962 into 3GPP downlink data 952 and non-3GPP downlink data 954 and forwards that data to the UPF 940 via the Nc user-plane interface 941. Note that, depending on the ATSSS-related downlink rules and the current situation (e.g. the amount and type of downlink data to be transmitted and current channel characteristics of the 3GPP and non-3GPP RANs 920 and 930), the external MPTCP proxy 950 may convert (i) all of the network downlink data 962 into 3GPP downlink data 952, (ii) all of the network downlink data 962 into non-3GPP downlink data 954, or (iii) some of both. Note further that, depending on the implementation and/or the current situation, the 3GPP downlink data 952 and the non-3GPP downlink data 954 may be completely different or may be partially or entirely redundant.

The external MPTCP proxy 950 forwards (i) the 3GPP downlink data 952 to the UPF 940 for wireless transmission to the UE 910 via the 3GPP RAN 920 and (ii) the non-3GPP downlink data 954 to the UPF 940 for wireless transmission to the UE 910 via the non-3GPP RAN 930. The UE 910 combines the 3GPP and non-3GPP downlink data 952 and 954 recover the network downlink data 962.

Note that, in addition to MPTCP traffic, the data network 960 may have non-MPTCP downlink data 964 to transmit to the UE 910 via the UPF 940. This non-MPTCP downlink data 964 is passed through the external MPTCP proxy 950 without any reformatting and then wirelessly transmitted from the UPF 940 to the UE 910 via the 3GPP RAN 920 and/or the non-3GPP RAN 930. In another possible embodiment, the data network 960 forwards the non-MPTCP downlink data 964 directly to the UPF 940.

Although embodiments have been described in the context of 5G networks having a Multi-Path Transmission Control Protocol (MPTCP) proxy node that is external to the UPF node, those skilled in the art will understand that the disclosure can also be implemented in the context of transport protocols other than TCP, such as the User Datagram Protocol (UDP). As used in the claims, the term "multi-path transport protocol" or MPTP, for short, is intended to be a generic term to cover either MPTCP functionality or multi-path UDP functionality.

In certain embodiments, an article of manufacture comprises a multi-path transport protocol (MPTP) proxy node for a 5G network further comprising a session management function (SMF) node connected to a user plane function (UPF) node. The MPTP proxy node is external to the UPF node, the SMF node is configured to provide address information of the external MPTP proxy node to a user equipment (UE) node, and the SMF node distributes access traffic steering, switching, and splitting (ATSSS)-related rules to the UE node, to the UPF node, and to the external MPTP proxy node. The external MPTP proxy node is configured to receive, from the UPF node, (i) 3GPP uplink data transmitted by the UE node via a 3GPP radio access network (RAN) and (ii) non-3GPP uplink data transmitted by the UE node via a non-3GPP RAN, combine the 3GPP and non-3GPP uplink data to form network uplink data, and provide the network uplink data to a data network. The external MPTP proxy node is also configured to receive network downlink data, divide the network downlink data into (i) 3GPP downlink data and (ii) non-3GPP downlink data, and provide the 3GPP and non-3GPP downlink data to the UPF node for transmission to the UE node via the 3GPP RAN and the non-3GPP RAN, respectively.

In at least some of the above embodiments, a policy control function (PCF) node provides the ATSSS-related rules to the SMF node, and the SMF node distributes the ATSSS-related rules to the UE node via an access and mobility management function (AMF) node.

In at least some of the above embodiments, the SMF node is pre-configured with the address information of the external MPTP proxy node.

In at least some of the above embodiments, the SMF node directly queries the external MPTP proxy node for the address information of the external MPTP proxy node.

In at least some of the above embodiments, the UPF node directly queries the external MPTP proxy node for the address information of the external MPTP proxy node, and the UPF node provides the address information of the external MPTP proxy node to the SMF node.

In at least some of the above embodiments, the SMF node distributes the ATSSS-related rules directly to the external MPTP proxy node.

In at least some of the above embodiments, the SMF node distributes the ATSSS-related rules to the external MPTP proxy node via the UPF node.

In at least some of the above embodiments, the UPF node receives the network downlink data from the data network and provides the network downlink data to the external MPTP proxy node.

In at least some of the above embodiments, the external MPTP proxy node receives the network downlink data directly from the data network.

In at least some of the above embodiments, the address information includes one or more IP addresses and a TCP port number for the external MPTP proxy.

In at least some of the above embodiments, the article further comprises the UPF node.

In at least some of the above embodiments, the article further comprises the SMF node.

Other embodiments of the present disclosure are the UPF node.

Still other embodiments of the present disclosure are the SMF node.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

Signals and corresponding terminals, nodes, ports, links, interfaces, or paths may be referred to by the same name and are interchangeable for purposes here.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

What is claimed is:

1. A system for a 5G network, the system comprising:
a session management function (SMF) node;
a user plane function (UPF) node connected to the SMF node; and
a multi-path transport protocol (MPTP) proxy node, wherein:
the MPTP proxy node is external to the UPF node;
the SMF node is configured to provide address information of the external MPTP proxy node to a user equipment (UE) node of the 5G network;
the SMF node is configured to distribute access traffic steering, switching, and splitting (ATSSS)-related rules to the UE node, to the UPF node via an SMF-UPF interface, and to the external MPTP proxy node either (i) directly, from the SMF node to the external MPTP proxy node via an SMF-proxy interface, or (ii) indirectly, from the SMF node to UPF node via the SMF-UPF interface and then from the UPF node to the MPTP proxy node via a UPF-proxy interface;
at least one of:
the SMF node is configured to distribute the ATSSS-related rules directly to the external MPTP proxy node, and the SMF node is configured to perform an MPTP proxy selection function to select the external MPTP proxy node; and
the SMF node is configured to distribute the ATSSS-related rules indirectly to the external MPTP proxy node, and the UPF node is configured to perform the MPTP proxy selection function to select the external MPTP proxy node;
the external MPTP proxy node is configured to (a) receive, from the UPF node via the UPF-proxy interface, (i) 3GPP uplink data transmitted by the UE node via a 3GPP radio access network (RAN) and (ii) non-3GPP uplink data transmitted by the UE node via a non-3GPP access network, (b) combine the 3GPP and non-3GPP uplink data to form network uplink data, and (c) provide the network uplink data to a data network; and
the external MPTP proxy node is configured to (a) receive network downlink data either (i) directly, from the data network via a network-proxy interface, or (ii) indirectly, from the data network to the UPF node via a network-UPF interface and then from the UPF node to the external MPTP proxy node via the UPF-proxy interface, (b) divide the network downlink data into (i) 3GPP downlink data and (ii) non-3GPP downlink data, and (c) provide the 3GPP and non-3GPP downlink data to the UPF node via the UPF-proxy interface for transmission to the UE node via the 3GPP RAN and the non-3GPP access network, respectively.

2. The system of claim 1, further comprising:
a policy control function (PCF) node configured to provide the ATSSS-related rules to the SMF node; and
an access and mobility management function (AMF) node, wherein the SMF node is configured to distribute the ATSSS-related rules to the UE node via the AMF node.

3. The system of claim 1, wherein the SMF node is configured to be pre-configured with the address information of the external MPTP proxy node.

4. The system of claim 1, wherein the SMF node is configured to directly query the external MPTP proxy node for the address information of the external MPTP proxy node via the SMF-proxy interface.

5. The system of claim 1, wherein:
the UPF node is configured to directly query the external MPTP proxy node for the address information of the external MPTP proxy node via the UPF-proxy interface; and
the UPF node is configured to provide the address information of the external MPTP proxy node to the SMF node via the SMF-UPF interface.

6. The system of claim 1, wherein the SMF node is configured to distribute the ATSSS-related rules directly to the external MPTP proxy node via the SMF-proxy interface.

7. The system of claim 1, wherein the SMF node is configured to distribute the ATSSS-related rules indirectly to the external MPTP proxy node via the SMF-UPF interface and the UPF proxy interface.

8. The system of claim 1, wherein the UPF node is configured to receive the network downlink data from the data network via the network-UPF interface and provide the network downlink data to the external MPTP proxy node via the UPF-proxy interface.

9. The system of claim 1, wherein the external MPTP proxy node is configured to receive the network downlink data directly from the data network via the network-proxy interface.

10. The system of claim 1, wherein:
the external MPTP proxy node is an external Multi-Path Transmission Control Protocol (MPTCP) proxy node; and
the address information includes one or more IP addresses and a TCP port number for the external MPTCP proxy node.

11. The system of claim 1, wherein the SMF node is configured to distribute the ATSSS-related rules directly to the external MPTP proxy node, wherein:
the SMF node is configured to send a session establishment/modification request with the address information of the external MPTP proxy directly to the UPF node via the SMF-UPF interface;
the UPF node is configured to send a session establishment/modification response directly to the SMF node via the SMF-UPF interface in response to the session establishment/modification request without allocating any MPTP proxy resources internal to the UPF;
the SMF node is configured to provide the ATSSS-related rules directly to the external MPTP proxy node via the SMF-proxy interface; and
the external MPTP proxy node is configured to send an acknowledgement message directly to the SMF node via the SMF-proxy interface.

12. The system of claim 1, wherein the SMF node is configured to distribute the ATSSS-related rules indirectly to the external MPTP proxy node, wherein:
the SMF node is configured to send a session establishment/modification request directly to the UPF node via the SMF-UPF interface;
the UPF node is configured to provide the ATSSS-related rules directly to the external MPTP proxy node via the UPF-proxy interface;
the external MPTP proxy node is configured to send an acknowledgement message directly to the UPF node via the UPF-proxy interface; and
the UPF node is configured to send a session establishment/modification response directly to the SMF node via the SMF-UPF interface in response to the session establishment/modification request.

13. The system of claim 1, wherein:
the external MPTP proxy node is an external multi-path User Datagram Protocol (UDP) proxy node; and
the address information includes one or more IP addresses and a UDP port number for the external multi-path UDP proxy node.

14. A method for a system for a 5G network, the system comprising:
a session management function (SMF) node;
a user plane function (UPF) node connected to the SMF node; and
a multi-path transport protocol (MPTP) proxy node, wherein the MPTP proxy node is external to the UPF node, wherein the method comprises:
the SMF node providing address information of the external MPTP proxy node to a user equipment (UE) node of the 5G network;
the SMF node distributing access traffic steering, switching, and splitting (ATSSS)—related rules to the UE node, to the UPF node via an SMF-UPF interface, and to the external MPTP proxy node either (i) directly, from the SMF node to the external MPTP proxy node via an SMF-proxy interface, or (ii) indirectly, from the SMF node to UPF node via the SMF-UPF interface and then from the UPF node to the MPTP proxy node via a UPF-proxy interface;
at least one of:
the SMF node distributes the ATSSS-related rules directly to the external MPTP proxy node, and the SMF node performing an MPTP proxy selection function to select the external MPTP proxy node; and
the SMF node distributes the ATSSS-related rules indirectly to the external MPTP proxy node, and the UPF node performing the MPTP proxy selection function to select the external MPTP proxy node;
the external MPTP proxy node (a) receiving, from the UPF node via the UPF-proxy interface, (i) 3GPP uplink data transmitted by the UE node via a 3GPP radio access network (RAN) and (ii) non-3GPP uplink data transmitted by the UE node via a non-3GPP access network, (b) combining the 3GPP and non-3GPP uplink data to form network uplink data, and (c) providing the network uplink data to a data network; and
the external MPTP proxy node (a) receiving network downlink data either (i) directly, from the data network via a network-proxy interface, or (ii) indirectly, from the data network to the UPF node via a network-UPF interface and then from the UPF node to the external MPTP proxy node via the UPF-proxy interface, (b) dividing the network downlink data into (i) 3GPP downlink data and (ii) non-3GPP downlink data, and (c) providing the 3GPP and non-3GPP downlink data to the UPF node via the UPF-proxy interface for transmission to the UE node via the 3GPP RAN and the non-3GPP access network, respectively.

15. The method of claim 14, wherein:
the method further comprises a policy control function (PCF) node of the system providing the ATSSS-related rules to the SMF node; and
the SMF node distributes the ATSSS-related rules to the UE node via an access and mobility management function (AM F) node of the system.

16. The method of claim 14, wherein the SMF node is pre-configured with the address information of the external MPTP proxy node.

17. The method of claim 14, wherein the SMF node directly queries the external MPTP proxy node for the address information of the external MPTP proxy node via the SMF-proxy interface.

18. The method of claim 14, wherein:
the UPF node directly queries the external MPTP proxy node for the address information of the external MPTP proxy node via the UPF-proxy interface; and
the UPF node provides the address information of the external MPTP proxy node to the SMF node via the SMF-UPF interface.

19. The method of claim 14, wherein the SMF node distributes the ATSSS-related rules directly to the external MPTP proxy node via the SMF-proxy interface.

20. The method of claim 14, wherein the SMF node distributes the ATSSS-related rules indirectly to the external MPTP proxy node via the SMF-UPF interface and the UPF-proxy interface.

21. The method of claim 14, wherein the UPF node receives the network downlink data from the data network via the network-UPF interface and provides the network downlink data to the external MPTP proxy node via the UPF-proxy interface.

22. The method of claim 14, wherein the external MPTP proxy node receives the network downlink data directly from the data network via the network-proxy interface.

23. The method of claim 14, wherein:
- the external MPTP proxy node is an external Multi-Path Transmission Control Protocol (MPTCP) proxy node; and
- the address information includes one or more IP addresses and a TCP port number for the external MPTCP proxy node.

24. The method of claim 14, wherein the SMF node distributes the ATSSS-related rules directly to the external MPTP proxy node, wherein:
- the SMF node sends a session establishment/modification request with the address information of the external MPTP proxy directly to the UPF node via the SMF-UPF interface;
- the UPF node sends a session establishment/modification response directly to the SMF node via the SMF-UPF interface in response to the session establishment/modification request without allocating any MPTP proxy resources internal to the UPF;
- the SMF node provides the ATSSS-related rules directly to the external MPTP proxy node via the SMF-proxy interface; and
- the external MPTP proxy node sends an acknowledgement message directly to the SMF node via the SMF-proxy interface.

25. The method of claim 14, wherein the SMF node distributes the ATSSS-related rules indirectly to the external MPTP proxy node, wherein:
- the SMF node sends a session establishment/modification request directly to the UPF node via the SMF-UPF interface;
- the UPF node provides the ATSSS-related rules directly to the external MPTP proxy node via the UPF-proxy interface;
- the external MPTP proxy node sends an acknowledgement message directly to the UPF node via the UPF-proxy interface; and
- the UPF node sends a session establishment/modification response directly to the SMF node via the SMF-UPF interface in response to the session establishment/modification request.

26. The method of claim 14, wherein:
- the external MPTP proxy node is an external multi-path User Datagram Protocol (UDP) proxy node; and
- the address information includes one or more IP addresses and a UDP port number for the external multi-path UDP proxy node.

* * * * *